United States Patent
Hagiwara et al.

(10) Patent No.: US 10,290,858 B2
(45) Date of Patent: May 14, 2019

(54) STORAGE ELEMENT FOR AN ELECTROCHEMICAL DEVICE, ELECTROCHEMICAL DEVICE USING SAID STORAGE ELEMENT, METHOD FOR MANUFACTURING STORAGE ELEMENT FOR ELECTROCHEMICAL DEVICE, AND METHOD FOR MANUFACTURING ELECTROCHEMICAL DEVICE

(75) Inventors: Naoto Hagiwara, Tokyo (JP); Katsuei Ishida, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 173 days.

(21) Appl. No.: 13/636,302

(22) PCT Filed: Mar. 11, 2011

(86) PCT No.: PCT/JP2011/055774
§ 371 (c)(1),
(2), (4) Date: Feb. 1, 2013

(87) PCT Pub. No.: WO2011/118418
PCT Pub. Date: Sep. 29, 2011

(65) Prior Publication Data
US 2013/0122350 A1 May 16, 2013

(30) Foreign Application Priority Data
Mar. 23, 2010 (JP) ................................. 2010-066549

(51) Int. Cl.
*H01G 9/00* (2006.01)
*H01M 4/139* (2010.01)
(Continued)

(52) U.S. Cl.
CPC .......... *H01M 4/139* (2013.01); *H01G 9/0029* (2013.01); *H01G 9/15* (2013.01);
(Continued)

(58) Field of Classification Search
CPC ........ H01G 11/76; H01G 11/72; H01G 11/28; H01G 11/26; H01G 9/15; H01G 9/0029;
(Continued)

(56) References Cited

U.S. PATENT DOCUMENTS 2,028,775 A * 1/1936 Hetenyi ........................ 361/526
3,426,257 A * 2/1969 Youngquist .............. H01G 2/00
174/520

(Continued)

FOREIGN PATENT DOCUMENTS

JP 04237109 A * 8/1992
JP 8-078291 3/1996
(Continued)

OTHER PUBLICATIONS

International Search Report of PCT/JP2011/055774 filed Mar. 11, 2011 (2 pages).
(Continued)

*Primary Examiner* — Philip A. Stuckey
(74) *Attorney, Agent, or Firm* — Pillsbury Winthrop Shaw Pittman, LLP

(57) ABSTRACT

One object is to provide an electric storage element for electrochemical devices that can prevent fall of active material powder from an outer edge of an active material layer, thereby preventing functional disorders due to the fall of the active material powder. In accordance with one aspect, an electric storage element has laminated structure wherein active material layers (first active material layer and second active material layer) are placed between an ion permeable layer and a first collector layer and between the ion permeable layer and a second collector layer. The active material layers have a smaller outline than the ion permeable layer and are tightly enclosed with insulating layers (first insulating layer and second insulating layer) filling the respective (Continued)

ambient regions corresponding to the difference in outlines from the ion permeable layer.

4 Claims, 14 Drawing Sheets

(51) Int. Cl.
| | |
|---|---|
| H01G 11/12 | (2013.01) |
| H01G 11/84 | (2013.01) |
| H01M 2/08 | (2006.01) |
| H01M 2/26 | (2006.01) |
| H01M 4/13 | (2010.01) |
| H01M 10/04 | (2006.01) |
| H01M 10/0525 | (2010.01) |
| H01M 10/0585 | (2010.01) |
| H01G 9/15 | (2006.01) |
| H01G 11/02 | (2013.01) |
| H01G 11/04 | (2013.01) |

(52) U.S. Cl.
CPC ............ *H01G 11/12* (2013.01); *H01G 11/84* (2013.01); *H01M 2/08* (2013.01); *H01M 2/266* (2013.01); *H01M 4/13* (2013.01); *H01M 10/0436* (2013.01); *H01M 10/0525* (2013.01); *H01M 10/0585* (2013.01); *H01G 11/02* (2013.01); *H01G 11/04* (2013.01); *Y02E 60/122* (2013.01); *Y02E 60/13* (2013.01); *Y02P 70/54* (2015.11); *Y10T 29/49117* (2015.01)

(58) Field of Classification Search
CPC ........ H01G 11/84; H01G 11/12; H01G 11/04; H01G 11/02; H01M 2/0207; H01M 2/027; H01M 4/139; H01M 10/0436; H01M 10/0585; H01M 10/0525; H01M 2/266; H01M 2/08; H01M 4/13; Y02P 70/54; Y10T 29/49117; Y02E 60/122; Y02E 60/13

USPC ...................... 429/163, 211; 29/825; 361/526
See application file for complete search history.

(56) References Cited

U.S. PATENT DOCUMENTS

| | | | | |
|---|---|---|---|---|
| 4,125,680 | A | * | 11/1978 | Shropshire ............... H01M 6/48 429/154 |
| 5,450,279 | A | * | 9/1995 | Yoshida ................. H01G 11/12 361/502 |
| 5,600,534 | A | * | 2/1997 | Blazek et al. ................ 361/502 |
| 5,744,258 | A | * | 4/1998 | Bai et al. ........................... 429/3 |
| 6,576,365 | B1 | | 6/2003 | Meitav et al. |
| 6,594,138 | B1 | * | 7/2003 | Belyakov ............... H01G 9/008 361/502 |
| 6,790,556 | B1 | | 9/2004 | Meitav et al. |
| 8,404,126 | B2 | * | 3/2013 | Ando et al. ..................... 216/13 |
| 2007/0139865 | A1 | * | 6/2007 | Sakamoto et al. ............ 361/541 |
| 2009/0015987 | A1 | | 1/2009 | Miura et al. |
| 2011/0256455 | A1 | * | 10/2011 | Coowar ................... H01G 9/02 429/247 |

FOREIGN PATENT DOCUMENTS

| | | |
|---|---|---|
| JP | 8-78291 A | 3/1996 |
| JP | 11-260355 | 9/1999 |
| JP | 2003-532277 A | 10/2003 |
| JP | 2006-324333 | 11/2006 |
| JP | 2006-324333 A | 11/2006 |
| JP | 2007-135790 | 6/2007 |
| JP | 2009-016721 | 1/2009 |
| JP | 2009-16721 A | 1/2009 |

OTHER PUBLICATIONS

Intl. Search Report/Written Opinion dated Jun. 7, 2011 of PCT/JP2011/055774 filed Mar. 11, 2011 (6 pages).
Chinese Office action dated Nov. 21, 2014 for Appln. No. 201180025622.4.

* cited by examiner

FIG. 5A
FIG. 5B
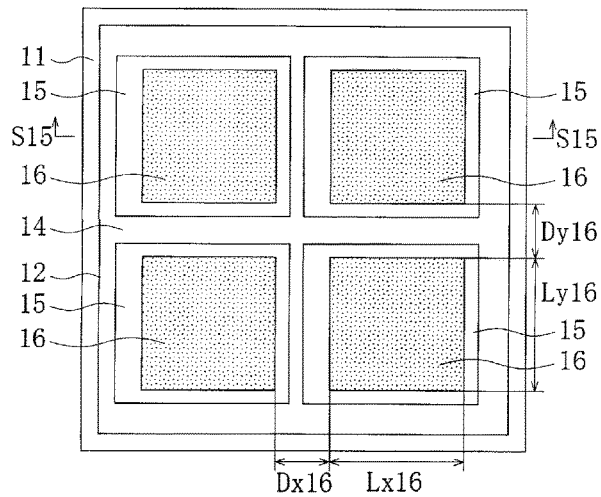
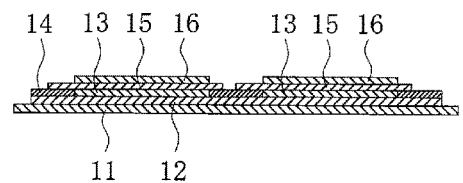
FIG. 6A
FIG. 6B
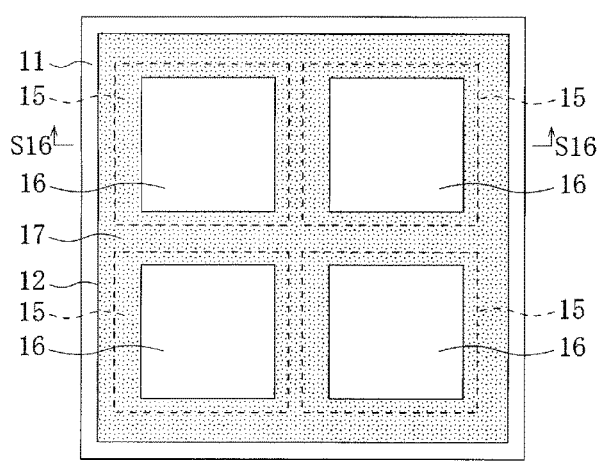
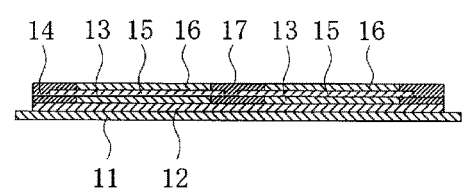

FIG. 20A
FIG. 20B
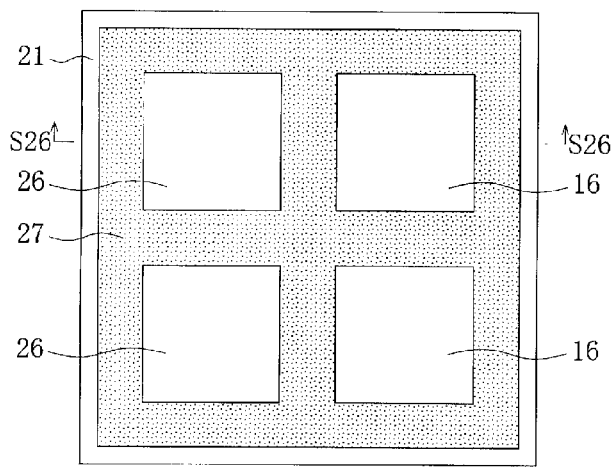
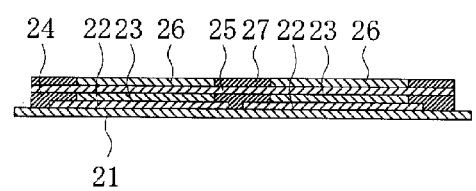
FIG. 21
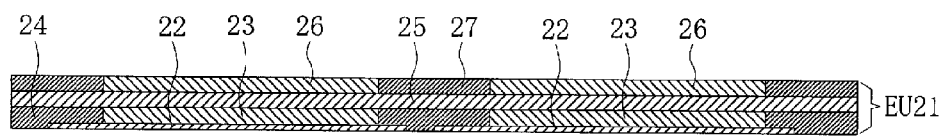

STORAGE ELEMENT FOR AN ELECTROCHEMICAL DEVICE, ELECTROCHEMICAL DEVICE USING SAID STORAGE ELEMENT, METHOD FOR MANUFACTURING STORAGE ELEMENT FOR ELECTROCHEMICAL DEVICE, AND METHOD FOR MANUFACTURING ELECTROCHEMICAL DEVICE

RELATED APPLICATIONS

This application is a U.S. National Stage application under 35 USC § 371 of PCT/JP2011/055774, filed Mar. 11, 2011 which claims priority tinder the Paris Convention to Japanese Application No. 2010-066549, filed Mar. 23, 2010, the entire contents of each of these applications being incorporated herein by reference.

TECHNICAL FIELD

The invention relates to an electric storage element suitable for electrochemical devices such as an electric double layer capacitor, lithium ion capacitor, redox capacitor, and lithium ion battery, and an electrochemical device containing the electric storage element, and the methods of fabricating the foregoings.

BACKGROUND

An electric storage element used in electrochemical devices such as an electric double layer capacitor, lithium ion capacitor, redox capacitor, and lithium ion battery has laminated structure wherein active material layers are placed between an ion permeable layer and a first collector layer and between the ion permeable layer and a second collector layer. Also, such electrochemical devices encapsulate the electric storage element in a package.

The active material layers in such an electric storage element are generally formed by applying an active material paste, containing an active material powder, a binder, and a conductive assistant, in a layer and then by drying the applied active material paste such that the active material layers are disposed between the ion permeable layer and the collector layers (the first and second collector layers). The outer edges of the active material layers are exposed externally from the electric storage element, like those of the ion permeable layer and the collector layers.

Therefore, there is a possibility that a bit of the active material powder may fall off the outer edges of the active material layers, due to an external force such as vibration or impact exerted while transporting the electric storage element or an electrochemical device containing the electric storage element, or due to an internal stress created during operation of the electrochemical device (e.g., an internal stress created by a gas produced at charge or discharge).

Since the active material powder is a conductive material, the fallen bit of the active material powder may cause functional disorders such as a short circuit between positive and negative electrodes, lowered charge or discharge capacity, or increased leakage current.

To prevent such functional disorders, some kinds of methods have been under development. One example of such attempts is to increase the proportion of the binder in the active material so as to enhance the bind in the active material powder. However; such an increased proportion of the non-conductive binder may increase the resistivity of the active material layer and lower the performance of the same.

RELEVANT REFERENCES

List of Relevant Patent Literature

Patent Literature 1: Japanese Patent Application Publication No, H11-260355;
Patent Literature 2: Japanese Patent Application Publication No. 2007-135790

SUMMARY

Various embodiments of the invention provide an electric storage element for electrochemical device that can suppress functional disorders that otherwise may be caused due to a fallen bit of active material powder. Further, various embodiments of the invention provide electrochemical devices containing the electric storage element, and methods of fabricating the electric storage elements and the electrochemical devices.

An electric storage element for an electrochemical device according to an embodiment of the invention has laminated structure wherein active material layers are placed between an ion permeable layer and a first collector layer and between the ion permeable layer and a second collector layer. Both active material layers have a smaller outline than the ion permeable layer and are enclosed with insulating layers filling the respective ambient regions corresponding to the difference in outlines from the ion permeable layer.

An electrochemical device according to an embodiment of the invention is an electrochemical device having an electric storage element encapsulated in a package, wherein the electric storage element is the above-described electric storage element for an electrochemical device.

A method of fabricating an electric storage element for an electrochemical device according to an embodiment of the invention is a method of fabricating an electric storage element for an electrochemical device having laminated structure wherein active material layers are placed between an ion permeable layer and a first collector layer and between the ion permeable layer and a second collector layer. The method comprises the steps of: fabricating a plurality of electrode units having a collector layer, two active material layers, and an ion permeable layer stacked in a predetermined order, the two active material layers being enclosed with insulating layers filling the respective ambient regions; and fabricating an electric storage element having the plurality of electrode units stacked and integrated together.

A method of fabricating an electrochemical device according to an embodiment of the invention is a method of fabricating an electrochemical device comprising an electric storage element encapsulated in a package, the electric storage element being the electric storage element for an electrochemical device fabricated by the above method, comprising the step of: encapsulating the electric storage element in the package.

An electric storage element or an electrochemical device according to an embodiment of the invention may achieve the following effects. That is, an electric storage element according to an embodiment of the invention has laminated structure wherein the active material layers placed between an ion permeable layer and a first collector layer and between the ion permeable layer and a second collector layer are enclosed with insulating layers filling the respective ambient regions corresponding to the difference in outlines from the ion permeable layer, thereby preventing the outer edges of both of the active material layers from being exposed. This arrangement securely prevents a bit of the active material powder from falling off the outer edges of the active material layers, even under an external force such as vibration or impact exerted while transporting the electric storage element or an electrochemical device containing the electric storage element, or under an internal stress created during operation of the electrochemical device (e.g., an internal stress created by a gas produced at charge or discharge). As a result, functional disorders that otherwise may be caused by the fallen bit of the active material powder, such as a short circuit between positive and negative electrodes, lowered charge or discharge capacity, or increased leakage current, can be prevented.

Meanwhile, the above-mentioned methods of fabricating the electric storage element and the electrochemical device may achieve the following effects. That is, an electric storage element is fabricated through the steps of: fabricating a plurality of electrode units each having structure wherein a collector layer, two active material layers, and an ion permeable layer are stacked in a predetermined order and the ambient regions of the active material layers are filled with insulating layers; and stacking the plurality of electrode units to form an integrated electronic storage element, thereby readily obtaining a desired electric storage element only by stacking and integrating together a required number of electrode units prepared in advance. In addition, a desired charge and discharge capacity is readily attained by varying the number (at least two) of the stacked electrode units.

Since the active material layers in the laminated structure of the fabricated electric storage element are enclosed with insulating layers filling the ambient regions corresponding to the difference in outlines from the ion permeable layer, the electric storage element securely prevents a bit of the active material powder from falling off the outer edges of the active material layers, even under an external force such as vibration or impact exerted while transporting the electric storage element or an electrochemical device containing the electric storage element, or under an internal stress created during operation of the electrochemical device (e.g., an internal stress created by a gas produced at charge or discharge). As a result, functional disorders caused by the fallen bit of the active material powder can be previously avoided.

Thus various embodiments of the invention provide an electric storage element for electrochemical device that can suppress functional disorders due to a fallen bit of active material powder. Further, various embodiments of the invention provide electrochemical devices containing the electric storage element, and fabrication methods suited for the electric storage elements and the electrochemical devices.

Other purposes, configurational features, and advantageous effects of the invention will be apparent through the following descriptions and the attached drawings.

BRIEF DESCRIPTION OF THE DRAWINGS

FIG. 5A is a diagram showing the fifth step of the method of fabricating the electric storage element as shown in FIG. 10. FIG. 5B is a sectional view taken along line S15-S15 of FIG. 5A.

FIG. 6A is a diagram showing the sixth step of the method of fabricating the electric storage element as shown in FIG. 10, FIG. 6B is a sectional view taken along line S16-S16 of FIG. 6A.

FIG. 20A is a diagram showing the sixth step of the method of fabricating the electric storage element as shown in FIG. 24. FIG. 20B is a sectional view taken along line S26-S26 of FIG. 20A.

FIG. 21 is a sectional view of an electrode unit obtained through the sixth step.

DESCRIPTION OF EXAMPLE EMBODIMENTS

The following are descriptions of specific examples of an electric storage element for an electrochemical device according to various embodiments of the invention, and an electrochemical device containing the electric storage element, and the methods of fabricating the foregoings.

Figure 1A:
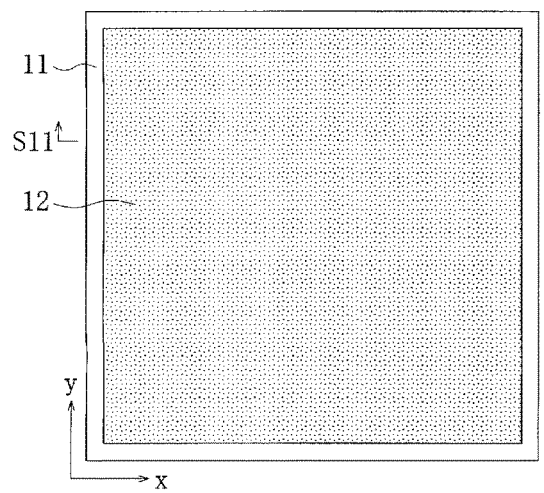
FIG. 1A is a diagram showing the first step of the method of fabricating an electric storage element as shown in FIG. 10.
Figure 1B:
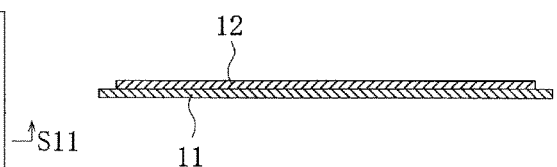
FIG. 1B is a sectional view taken along line S11-S11 of FIG. 1A.

The crosswise and vertical directions in FIG. 1A are hereinafter referred to as X and Y directions, respectively, and a vertical direction in FIG. 1B is hereinafter referred to as a laminating direction. Directions in other figures corresponding to these directions are referred to as the same.

Figure 10A:
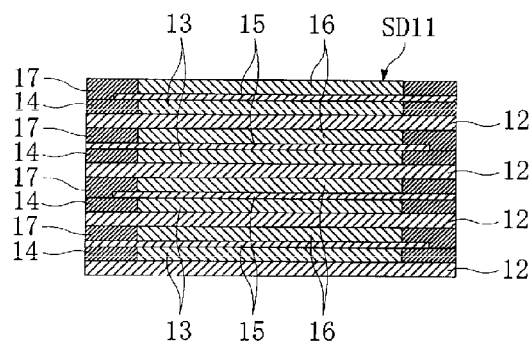
FIG. 10A is a sectional view of the electric storage element obtained through the eighth step.
Figure 10B:
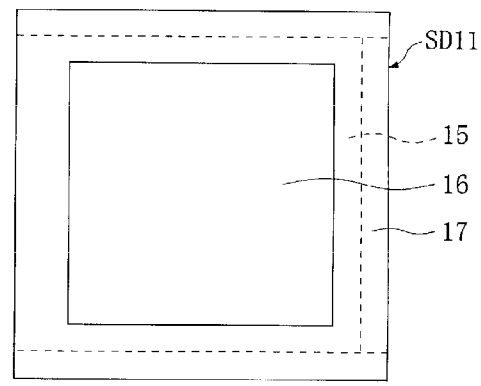
FIG. 10B is a top view of the same electric storage element.

As shown in FIGS. 1A and 1B, the first step of fabricating an electric storage element SD11 as shown in FIGS. 10A and 10B is to form an ion permeable layer 12 having a rectangular top view outline on a top surface of a base film 11 having a rectangular top view outline. The permeable layer 12 is formed in a predefined thickness.

In an embodiment, the ion permeable layer 12 may be formed on the base film 11. The base film 11 may be made of polyethylene terephthalate (PET) or other materials and have a thickness of 5 to 50 μm. The ion permeable layer 12 may be formed by applying a paste prepared for forming the ion permeable layer in a layer form by a known printing method such as screen printing or intaglio printing, and then drying the layer of the applied paste by a method such as hot air blowing or placing into a drying furnace. A thickness of thus dried ion permeable layer 12 may be, for example, in a range of 3 to 30 μm.

As shown in FIGS. 1A and 1B, a top view outline of the ion permeable layer 12 is slightly smaller than that of the base film 11.

In an embodiment, the paste for forming the ion permeable layer contains: an insulating powder comprising silica, alumina, or other materials having an average particle size of 1 μm or less; a binder comprising carboxymethyl cellulose (CMC), polyvinyl alcohol (PVA), or other materials; and a solvent such as water or N-Methyl pirrolidone (NMP). The paste for forming the ion permeable layer can be obtained by, for example, mixing the insulating powder and the binder in a compounding ratio (volume ratio) from 90:10 to 80:20, and then mixing the mixture with the solvent in a compounding ratio (volume ratio) from 10:90 to 50:50. The ion permeable layer 12 formed of the paste for forming the ion permeable layer may have a porosity that allows permeation of ions and impregnation and flow of an electrolyte as further described below.

Figure 2A:
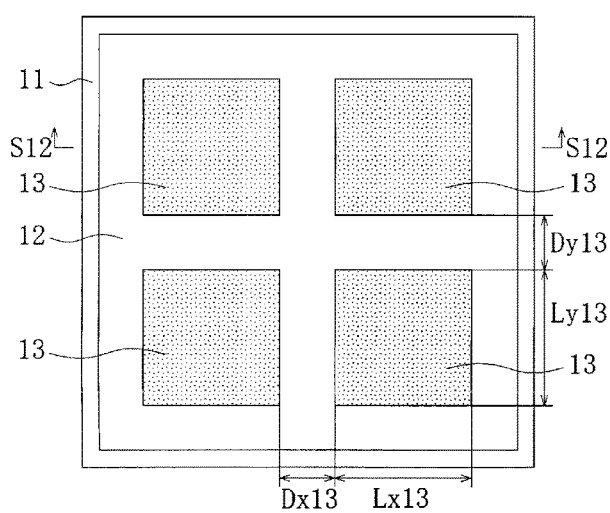
FIG. 2A is a diagram showing the second step of the method of fabricating the electric storage element as shown in FIG. 10.
Figure 2B:
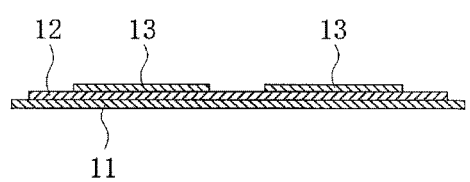
FIG. 2B is a sectional view taken along line S12-S12 of FIG. 2A.

Then, as shown in FIGS. 2A and 2B, four first active material layers 13 each having, for example, a rectangular top view outline are formed on the top surface of the ion permeable layer 12 in a predefined thickness.

In an embodiment, four first active material layers 13 are formed in a matrix form on the top surface of the ion permeable layer 12 by applying, in a layer form, a paste prepared for forming an active material layer by a known printing method such as screen printing or intaglio printing, and then drying the formed layer by a method such as hot air blowing or placing into a drying furnace. A thickness of each of the dried first active material layers 13 may be, for example, in a range of 1 to 30 μm.

In an embodiment, the paste for forming the active material layer contains: an active material powder comprising activated carbon, synthetic graphite, polyacene, or other materials having an average particle size of 1 μm or less; a binder comprising carboxymethyl cellulose (CMC), an aquatic slurry material such as styrene-butadiene rubber (SBR), and an organic solvent based slurry material such as polyvinylidene-fluoride (PVdF), a conductive assistant comprising acethylene black, Ketjen black, or carbon nano tube; and a solvent such as water or N-Methyl pirrolidone (NMP). The paste for forming an active material layer can be obtained by, for example, mixing the active material powder, the binder, and the conductive assistants in a compounding ratio (volume ratio) from 100:1:1 to 100:5:10, and then mixing the mixture with the solvent in a compounding ratio (volume ratio) from 10:90 to 50:50. Each of the first active material layers 13 formed of the paste for forming the active material layer is electrically conductive.

As shown in FIGS. 2A and 2B, each of the first active material layers 13 may have a length Lx13 in X direction and a length Ly13 in Y direction. In one embodiment, Lx 13 in X direction and Ly13 in Y direction may be equal, and the spacing Dx13 in X direction and the spacing Dy13 in Y direction between the first active material layers 13 formed in a matrix form may also be equal.

Figure 3A:
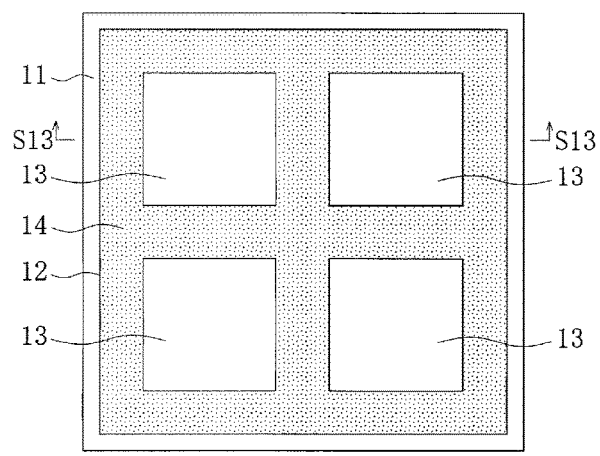
FIG. 3A is a diagram showing the third step of the method of fabricating the electric storage element as shown in FIG. 10.
Figure 3B:
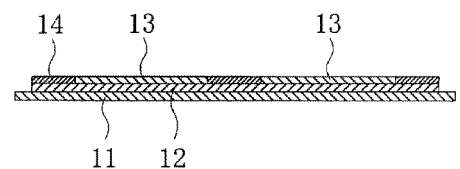
FIG. 3B, is a sectional view taken along line S13-S13 of FIG. 3A.

Subsequently, as shown in FIGS. 3A and 3B, for example, a first insulating layer 14 may be formed on the top surface of the ion permeable layer 12 to fill the ambient region of each of the first active material layers 13 and to make the top surface of the first insulating layer 14 even with the top surface of each of the first active material layers 13.

In an embodiment, the first insulating layer 14 is formed in the ambient region of the first active material layer 13 on the top surface of the ion permeable layer 12 by applying, in a layer form, a paste prepared for forming the insulating layer by a known printing method such as screen printing or intaglio printing, and then drying the formed layer by a method such as hot air blowing or placing into a drying furnace.

In an embodiment, the paste for forming the insulating layer contains: an insulating powder comprising silica, alumina, or other materials having an average particle size of 1 μm or less; a binder comprising carboxymethyl cellulose (CMC), polyvinyl alcohol (PVA), or other materials; and a solvent such as water or N-Methyl pirrolidone (NMP). The paste for forming the insulating layer can be obtained by, for example, mixing the insulating powder and the binder in a compounding ratio (volume ratio) from 90:10 to 80:20, and then mixing the mixture with the solvent in a compounding ratio (volume ratio) from 10:90 to 50:50. The first insulating layer 14 formed of the paste for forming the insulating layer has a porosity that allows permeation of ions and impregnation and flow of an electrolyte as described below.

As shown in FIGS. 3A and 3B, the top view outline of the first insulating layer 14 according to an embodiment may be identical to that of the ion permeable layer 12.

Figure 4A:
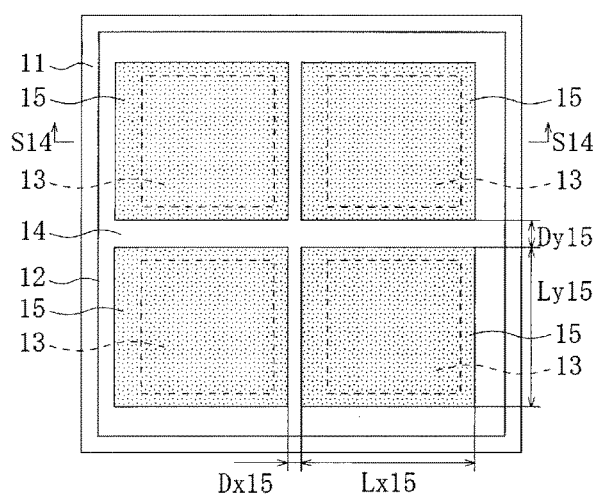
FIG. 4A is a diagram showing the fourth step of the method of fabricating the electric storage element as shown in FIG. 10.
Figure 4B:
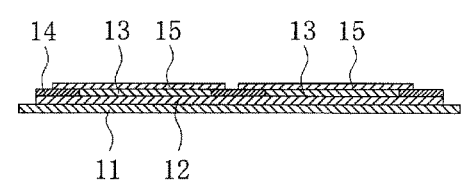
FIG. 4B is a sectional view taken along line S14-S14 of FIG. 4A.

Then, as shown in FIGS. 4A and 4B, for example, four collector layers 15 each having a rectangular top view outline are formed on the top surfaces of the ion permeable layer 12 and each of the first active material layers 13 in a predefined thickness.

In an embodiment, four collector layers 15 may be formed in a matrix form on the top surfaces of the ion permeable layer 12 and each of the first active material layers, by applying, in a layer form, a paste prepared for forming the collector layer by a known printing method such as screen printing or intaglio printing, so as to cover the entire top surface of each of the first active material layers 13, then drying the formed layer by a method such as hot air blowing or placing into a drying furnace. A thickness of each of the dried collector layers 15 is, for example, in a range of 1 to 30 μm.

In an embodiment, the paste for forming the collector layer contains: an electrically conductive powder having an average particle size of 1 μm or less comprising carbon, aluminum, copper, nickel, or other materials selected based on the polarity and the combination with the active material; a binder comprising a phenolic resin, ethyl cellulose, polyalkyl methacrylate or other materials; and a solvent comprising terpineol. The paste for forming the collector layer can be obtained by, for example, mixing the electrically conductive powder and the binder in a compounding ratio (volume ratio) from 10:1 to 3:1, and then mixing the mixture with the solvent in a compounding ratio (volume ratio) from 10:90 to 50:50. Each of the collector layers 15 formed of the paste for forming the collector layer is electrically conductive.

As shown in FIGS. 4A and 4B, each of the collector layers 15 may have a length Lx15 in X direction and a length Ly15 in Y direction slightly smaller than Lx15. In an embodiment, Lx15 in X direction is slightly larger than Lx13 in X direction of the first active material layer 13, and the Ly15 in Y direction is slightly larger than the Ly13 in Y direction of the first active material layer 13. Also, in an embodiment, the spacing Dx15 in X direction between the collector layers 15 formed in a matrix is smaller than the spacing Dy15 in Y direction between the collector layers 15 by an amount corresponding to Lx15-Ly15. A center of each of the collector layers 15 deviates to left in X direction by an amount corresponding to (Lx15−Ly15)/2 from a center of the corresponding first active material layer 13.

In an embodiment, as viewed from above, each of the collector layers 15 may be disposed to cover the entire top surface of the corresponding first active material layer 13. Also, in an embodiment, the upper edge and the lower edge in Y direction of each of the collector layers 15 extend beyond the upper edge and the lower edge in Y direction of the corresponding first active material layer 13, respectively, by an amount corresponding to (Ly15−Ly13)/2; and the right edge in X direction of each of the collector layers 15 extends beyond the right edge in X direction of the corresponding first active material layer 13 by the same amount. Also, in an embodiment, the left edge in X direction of each of the collector layers 15 extends beyond the left edge in X direction of the corresponding first active material layer 13 by an amount corresponding to Lx15−[(Ly15+Ly13)/2] which is equal to one half the spacing Dx13 in X direction between the first active material layers 13.

Then, as shown in FIGS. 5A and 5B, four second active material layers 16 each having a rectangular top view outline may be formed on the top surfaces of the corresponding collector layer 15 in a predefined thickness.

In an embodiment, four second active material layers 16 may be formed in a matrix form on the top surface of the corresponding collector layer 15 by applying, in a layer form, a paste for forming the active material layer by a known printing method such as screen printing or intaglio printing, and then drying the formed layer by a method such as hot air blowing or placing into a drying furnace. A thickness of each of the dried first active material layers 16 may be, for example, in a range of 2 to 30 μm.

The paste for forming the active material layer used therein may be the same as used to form the first active material layers 13. Each of the second active material layers 16 formed of the paste for forming the active material layer is electrically conductive.

As shown in FIGS. 5A and 5B, each of the second active material layers 16 may have a length Lx16 in X direction and a length Ly16 in Y direction equal to Lx16. In an embodiment, Lx16 in X direction may be equal to Lx13 in X direction of the first active material layer 13, and Ly16 in Y direction may be equal to Ly13 in Y direction of the first active material layer 13. Also, in an embodiment, a center of each of the second active material layers 16 corresponds to a center of the corresponding first active material layer 13.

With this arrangement, the upper edge in Y direction, the lower edge in Y direction, the left edge in X direction, and the right edge in X direction of each of the second active material layers 16 corresponds, as viewed from above, to the upper edge in Y direction, the lower edge in Y direction, the left edge in X direction, and the right edge in X direction of the corresponding first active material layer 13, respectively.

Subsequently, as shown in FIGS. 6A and 6B, in an embodiment, a second insulating layer 17 may be formed on the top surfaces of the first insulating layer 14 and the collector layers 15 to fill the ambient region of each of the second active material layers 16 and to make the top surface of the second insulating layer 17 even with the top surface of each of the second active material layers 16.

In an embodiment, the second active material layers 17 may be formed in the ambient region of the second active material layers 16 on the top surfaces of the first insulating layer 14 and the collector layers 15, by applying a paste prepared for forming the insulating layer in a layer form by a known printing method such as screen printing or intaglio printing, and then drying the formed layer by a method such as hot air blowing or placing into a drying furnace.

The paste for forming the insulating layer used herein may be the same as used to form the first insulating layer 14. The second insulating layer 17 formed of the paste for forming the insulating layer may have a porosity that allows permeation of ions and impregnation and flow of an electrolyte as described below.

As shown in FIGS. 6A and 6B, the top view outline of the second insulating layer 17 may be identical to that of the first insulating layer 14.

Figure 7:
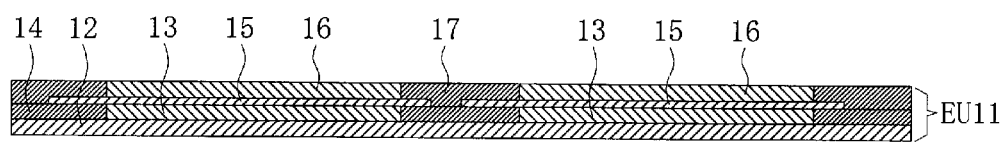
FIG. 7 is a sectional view of an electrode unit obtained through the sixth step.

Subsequently, the base film 11 may be removed from the structure as shown in FIGS. 6A and 6B, thereby obtaining an electrode unit EU11 having a laminated structure as shown in FIG. 7. The thus obtained electrode unit EU11 has a structure wherein an ion permeable layer 12, first active material layer 13, collector layer 15, and second active material layer 16 are stacked together and wherein the ambient regions of the first active material layer 13 and the second active material layer 16 are filled with the first insulating layer 12 and the second insulating layer 17, respectively.

Figure 8:
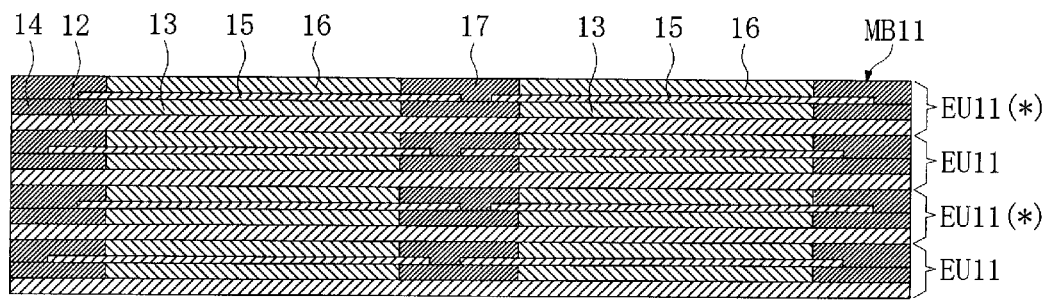
FIG. 8 is a sectional view of a laminated body showing the seventh step of the method of fabricating the electric storage element as shown in FIG. 10.

Subsequently, as shown in FIG. 8, a plurality (four in the figure) of the electrode units EU11 are stacked together such that the X direction (orthogonal to the laminating direction) of the electrode units is alternated by 180°, and then heated and pressurized to produce a laminated body MB11 comprising the integrated electrode units EU11.

Of the four electrode units EU11 shown in FIG. 8, the second and fourth electrode units EU11 from the bottom accompanied by an asterisk beside the reference sign have the X direction of the electrode unit shown in FIG. 7 altered by 180°.

When the stacked electrode units are being heated and pressurized, the layers constituting each electrode unit EU11 are urged slightly in the lamination direction; therefore, the layers constituting each electrode unit EU11 are adhered tightly to each other at the interfaces, and neighboring electrode units EU11 are also adhered tightly to each other at the interfaces.

Also, the left edge in X direction of each of the collector layers 15 extends beyond the left edge in X direction of the corresponding first active material layer 13 by an amount equal to one half the spacing Dx13 in X direction between the first active material layers; therefore, as viewed from above, the left edges in X direction of the first and third collector layers 15 from the bottom disposed in the right part in X direction of the laminated body MB11 correspond to the right edges in X direction of the second and fourth collector layers 15 from the bottom disposed in the left part in X direction of the laminated body MB11.

Figure 9:
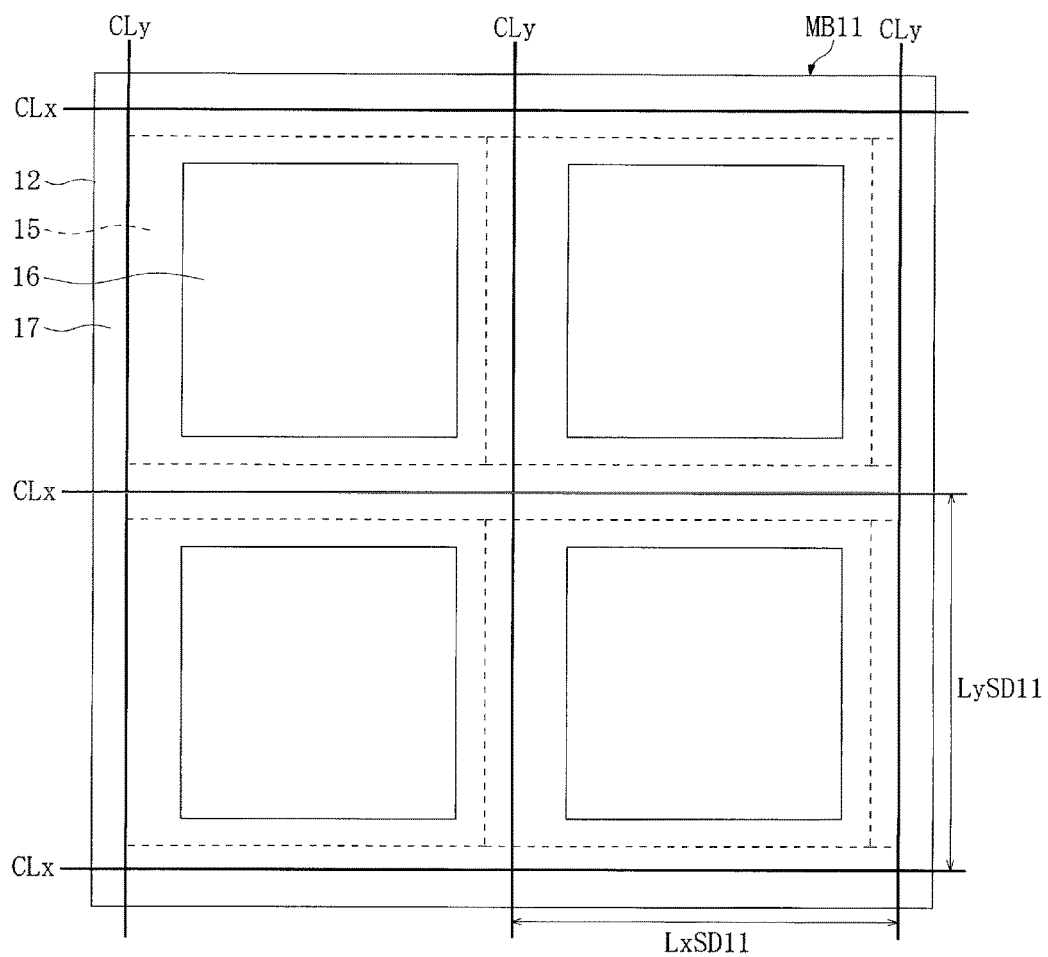
FIG. 9 is a top view of a laminated body showing the eighth step of the method of fabricating the electric storage element ds shown in FIG. 10.

Subsequently, as shown in FIG. 9, cut line CLx in X direction and cut line CLy in Y direction are set on the top surface of the laminated body MB11.

In an embodiment, each of the cut lines CLy in Y direction may be set to align with left edges in X direction of the first and third collector layers 15 from the bottom and the right edges in X direction of the second and fourth collector layers 15 from the bottom of the laminated body MB11 shown in FIG. 8. Also, a center cut line CLx in X direction may be set to align with a center of the spacing Dy13 in Y direction between the first active material layers 13 (i.e., the spacing Dy16 in Y direction between the second active material layers 16). Further, the other two cut lines CLx in X direction are set such that each of the first active material layers 13 has a spacing corresponding to one half the spacing Dy13 in Y direction on both the upper edge in Y direction and the lower edge in Y direction.

Subsequently, the laminated body MB11 is cut with a cutting device such as a dicing device having a rotating blade along the cut lines CLx in X direction and cut lines CLy in Y direction as shown in FIG. 9, thereby obtaining four electric storage elements SD11 having a laminated structure as shown in FIGS. 10A and 10B.

The cutting may be performed with a width corresponding to a thickness of the blade such that the left edges in X direction of the first and third collector layers 15 from the bottom of the electric storage element SD11 are exposed from the left side surface in X direction of the electric storage element SD11 through the first insulating layer 14 and the second insulating layer 17. Also, the right edges in X direction of the second and fourth collector layers 15 from the bottom of the electric storage element SD11 are exposed from the right surface in X direction of the electric storage element SD11 through the first insulating layer 14 and the second insulating layer 17.

For convenience of illustration, FIGS. 1-10 show a method for simultaneously fabricating four electric storage elements SD11 by using a plurality of four-piece electrode units EU11. The same fabricating method can be applied to a plurality of five-or-more-piece electric storage elements stacked together to simultaneously fabricate five or more electric storage elements. Also, the same fabricating method can be applied to a plurality of one-piece electric storage elements stacked together to fabricate one electric storage element.

Additionally, for convenience of illustration, FIGS. 1-10 show a method of fabricating an electric storage element SD11 with four electrode units EU11 stacked together. The charge and discharge capacity can be changed in accordance with the number of stacked electrode units EU11.

In an electric storage element SD11 as shown in FIGS. 10A and 10B, the two collector layers 15 with the left edges in X direction exposed from the left side surface in X direction of the electric storage element SD11 are available as collector layers for one polarity (hereinafter referred to as "first collector layers 15"); on the other hand, the two collector layers 15 with the right edges in X direction exposed from the right side surface in X direction of the electric storage element SD11 are available as collector layers for the other polarity (hereinafter referred to as "second collector layers 15").

Also, the top surface and the bottom surface of the active material layers (the first active material layer 13 and the second active material layer 16) are covered with the ion permeable layer 12 or the first collector layer 15. The ambient region corresponding to the difference between the outlines of the active material layers and the ion permeable layer 12 are filled with insulating layers (the first insulating layer 14 and the second insulating layer 17) tightly adhered to the active material layers. Therefore, the active material layers (the first active material layer 13 and the second active material layer 16) are entirely enclosed in other materials constituting the electric storage element SD11 and are not exposed outside the electric storage element SD11.

Figure 11A:
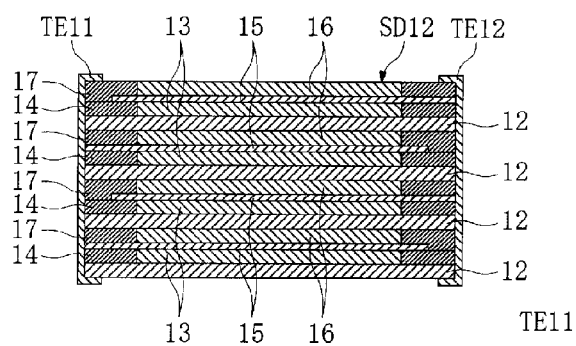
FIG. 11A is a sectional view of an example of the electric storage element shown in FIG. 10 provided with terminals.
Figure 11B:
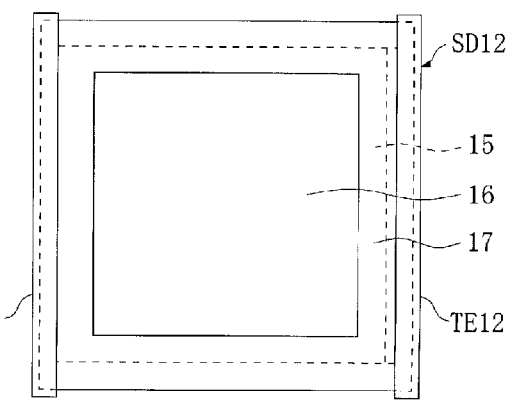
FIG. 11B is a top view of the same electric storage element.

FIGS. 11A and 11B show an electric storage element SD12 fabricated by providing the electric storage element SD11 with terminals TE11 and TE12. The electric storage element SD12 is provided, on the left side surface in X direction, with the first collective terminal TE11 covering the left side surface in X direction; and the first collective terminal TE11 is electrically connected to the exposed part of each of the first collector layers 15. The electric storage element SD12 is provided, on the right side surface in X direction, with the second collective terminal TE12 covering the right side surface in X direction; and the second collective terminal TE12 is electrically connected to the exposed part of each of the second collector layers 15.

The first collective terminal TE11 and the second collective terminal TE12 are formed by, for example, applying a paste prepared for forming the terminals in a layer form to the left and right side surfaces in X direction of the electric storage element SD12 by a known printing method such as dip method, and then drying the formed layer by a method such as hot air blowing or placing into a drying furnace.

The paste for forming the terminals contains: an electrically conductive powder having an average particle size of 1 μm or less comprising carbon, aluminum, copper, nickel, or other materials selected based on the polarity and the combination with the active material; a binder comprising a phenolic resin, ethyl cellulose, polyalkyl methacrylate, or other materials; and a solvent comprising terpineol. The paste for forming the terminals may be obtained by, for example, mixing the electrically conductive powder and the binder in a compounding ratio (volume ratio) from 10:1 to 3:1, and then mixing the mixture with the solvent in a compounding ratio (volume ratio) from 10:90 to 50:50. Each of the terminals TE11 and TE12 formed of the paste for forming the terminals is electrically conductive.

Figure 12A:
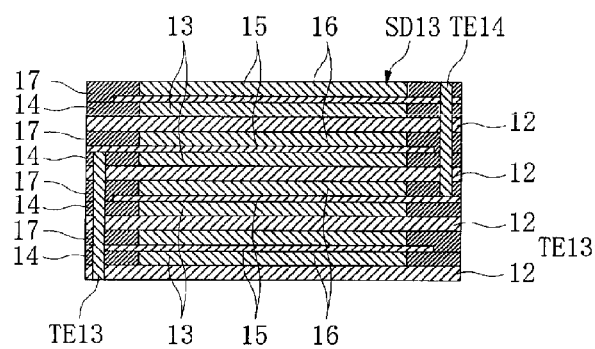
FIG. 12A is a sectional view of another example of the electric storage element shown in FIG. 10 provided with terminals.
Figure 12B:
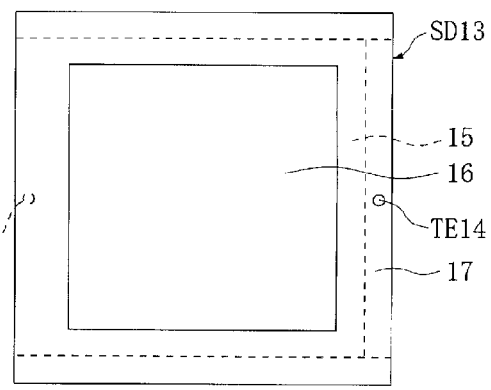
FIG. 12B is a top view of the same electric storage element.

FIGS. 12A and 12B show an electric storage element SD13 fabricated by providing the electric storage element SD11 according to an embodiment with terminals TE13 and TE14. The electric storage element SD13 is provided, in the left part in X direction, with a columnar hole extending upwardly from the bottom surface. The columnar hole contains a first collective terminal TE13 having a columnar shape and electrically connected to an internal part of the exposed portions of each of first collector layers 15. Also, the electric storage element SD13 is provided, in the right part in X direction, with a columnar hole extending downwardly from the top surface. The columnar hole contains a second collective terminal TE14 having a columnar shape and electrically connected to an internal part of the exposed portions of each of second collector layers 15. Further, the bottom surface of the first collective terminal TE13 is exposed at the bottom surface of the electric storage element SD13, and the top surface of the second collective terminal TE14 is exposed at the top surface of the electric storage element SD13.

The first collective terminal TE13 and the second collective terminal TE14 are formed by, for example, forming a column shaped hole upwardly from the bottom surface in laminating direction in the left part in X direction of electric storage element SD13 by a known method such as drilling or laser machining, filling a paste prepared for forming the terminals into the columnar holes, and then drying the filled paste by a method such as hot air blowing or placing into a drying furnace.

The paste for forming the terminals used herein may be the same as used to form the terminals TE11 and TE12. Each of the terminals TE13 and TE14 formed of the paste for forming the terminals is electrically conductive.

Figure 13:
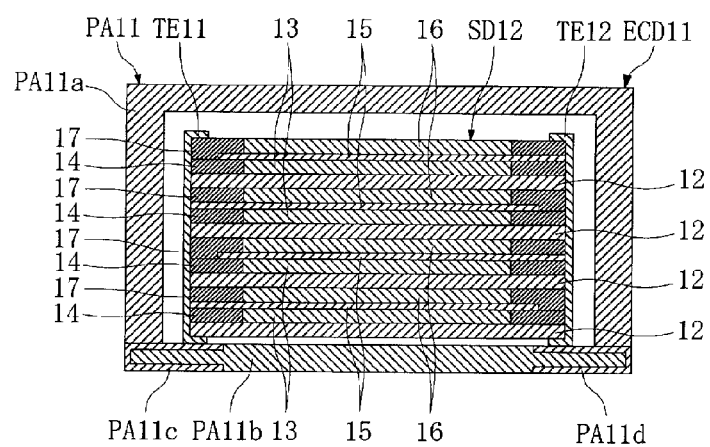
FIG. 13 is a sectional view of an electrochemical device fabricated with the electric storage element as shown in FIG. 11.

FIG. 13 shows an example of an electrochemical device ECD11 fabricated by using an electric storage element SD12 as shown in FIGS. 11A and 11B. The electrochemical device ECD11 is constructed, for example, by encapsulating the electric storage element SD12 in a package PA11 together with an electrolyte (not denoted by a sign). In an embodiment, the electrolyte comprises BF4 salt of quaternary ammonium for a capacitor, or PF6 salt of lithium for a lithium ion capacitor or lithium ion battery, dissolved in a simplex solvent such as propylene carbonate (PC), ethylene carbonate (EC), dimethyl carbonate (DMC), or ethyl methyl carbonate (EMC), or a mixed solvent of these materials.

In an embodiment, the package PA11 comprises: an insulating case PA11a comprising plastic and having an open bottom; and an insulating plate PA11b comprising plastic. The insulating plate PA11b is provided with a first outer terminal PA11c and a second outer terminal PA11d made of a metal.

In an embodiment, when the electrochemical device ECD11 is fabricated, a part of the first collective terminal TE11 of the electric storage element SD12 is electrically connected to the first outer terminal PA11c of the insulating plate PA11b through conductive adhesive agent; and a part of the second collective terminal TE12 is electrically connected to the second outer terminal PA11d of the insulating plate PA11b through the conductive adhesive agent. Next, the insulating case PA11a is inverted, and the electrolyte is filled therein. The insulating plate PA11b on which the electric storage element SD12 is installed is inverted to insert the electric storage element SD12 into the insulating case PA11a. Then, the insulating plate PA11b and the insulating case PA11a are bonded at the contact portions through an insulating adhesive agent, and the opening of the insulating case PA11a is closed in a water and air tight manner.

Figure 14:
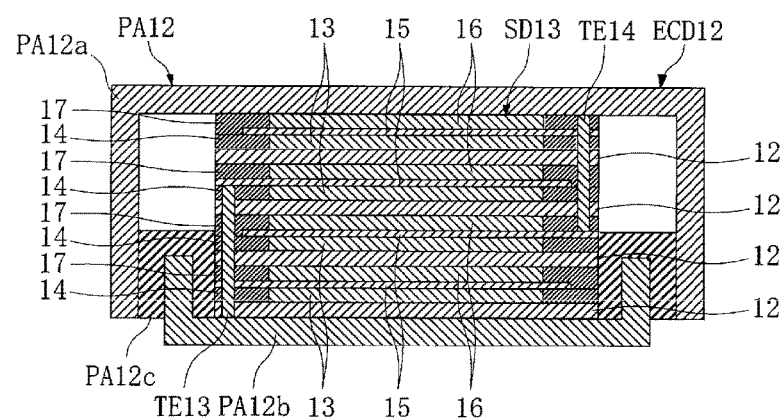
FIG. 14 is a sectional view of an electrochemical device fabricated with the electric storage element as shown in FIG. 12.

FIG. 14 shows an electrochemical device ECD12 according to an embodiment fabricated by using an electric storage element SD13 as shown in FIGS. 12A and 12B. The electrochemical device ECD12 is constructed, for example, by encapsulating the electric storage element SD13 in a package PA12 together with an electrolyte (not denoted by a sign). In an embodiment, the electrolyte comprises BF4 salt of quaternary ammonium for a capacitor, or PF6 salt of lithium for a lithium ion capacitor or lithium ion battery, dissolved in a simplex solvent such as propylene carbonate (PC), ethylene carbonate (EC), dimethyl carbonate (DMC), or ethyl methyl carbonate (EMC), or a mixed solvent of these materials. The package PA12 comprises: for example, a first conductive case PA12a comprising a metal and having an open bottom; a second conductive case PA12b comprising a metal and having an open top; and a ring-shaped insulating gasket PA12c comprising plastic.

In an embodiment, when the electrochemical device ECD12 is fabricated, an exposed portion of the second collective terminal TE14 of the electric storage element SD13 is electrically connected to an internal part of the first conductive case PA12a through a conductive adhesive agent. Next, the first conductive case PA12a is inverted, and the electrolyte is filled therein. While the second conductive case PA12b on which insulating gaskets PA12c are installed is being inserted into the first conductive case PA12a, an exposed portion of the first collective terminal TE13 of the electric storage element SD13 is electrically connected to an internal part of the second conductive case PA12b through the conductive adhesive agent, and the opening of the first conductive case PA12a is closed by using the insulating gasket PA12c in a water and air tight manner.

The electric storage elements (SD11, SD12, and SD13) and the electrochemical devices (ECD11 and ECD12) containing the electric storage elements provide, for example, the following effects.

The electric storage element SD11 has a laminated structure wherein the first insulating layers 14 and the second insulating layers 17 tightly enclose the first active material layers 13 and the second active material layers 16 disposed between the ion permeable layers 12 and the first collector layers 15 and between the ion permeable layer 12 and the second collector layer 15, by filling the ambient region corresponding to the difference in outline from the ion permeable layers 12. Therefore, none of the surfaces of the outer edges of the first active material layers 13 and the second active material layers 16 is exposed to the atmosphere. In an embodiment, on part of one surface of the ion permeable layer 12 is provided the first active material layer 13, and on the other part of the same surface is provided the first insulating layer 14. On part of the other surface of the ion permeable layer 12 is provided the second active material layer 16, and on the other part of the same surface is provided the second insulating layer 17.

This arrangement securely prevents a bit of the active material powder from falling off the outer edges of the active material layers 13 and 16, due to an external force such as vibration or impact exerted when the electric storage element SD11, SD12, or SD13 or an electrochemical device ECD11 or ECD12 containing the electric storage element is transported, or due to an internal stress created during operation of the electrochemical device ECD11 or ECD12 (e.g., an internal stress created by a gas produced at charge or discharge). As a result, functional disorders caused by the fallen bit of the active material powder from the outer edges of the first active material layer 13 and the second active material layer 16, such as a short circuit between positive and negative electrodes, lowered charge or discharge capacity, or increased leakage current, can be previously avoided.

The electric storage element SD11 has a structure wherein part of the outer edge of each of the first collector layers 15 (for example, the left edge in X direction) is exposed from a side surface of the electric storage element SD11 (for example, a left side surface in X direction) through the first insulating layer 14 and the second insulating layer 17, and part of the outer edge of each of the second collector layers 15 (for example, right edge in X direction) is exposed from a side surface of the electric storage element SD11 (for example, a right side surface in X direction) through the first insulating layer 14 and second insulating layer 17 at the position different from those of the exposed portions of the first collector layers 15; therefore, a plurality of collector layers 15 included in the electric storage element SD11 can be functionally divided into the first collector layers 15 used for one polarity and the second collector layers 15 used for the other polarity.

The electric storage elements SD12 and SD13 have the first collective terminals TE11 and TE13 electrically connected to each of the first collector layers 15 at the exposed or internal part and used for one polarity, and the second collective terminals TE12 and TE14 electrically connected to each of the second collector layers 15 at the exposed or internal part and used for the other polarity. This arrangement facilitates the connection to the portions of the packages P11 and PA12 corresponding to outer terminals (i.e., the first outer terminal PA11c and the second outer terminal PA11d of the package PA11, and the first conductive case PA12a and the second conductive case PA12b of the package PA12), when the electrochemical devices ECD11 and ECD12 are fabricated by encapsulating the electric storage elements SD12 and SD13 in the packages PA11 and PA12.

The method of fabricating the electric storage elements (SD11, SD12, and SD13) and the electrochemical devices (ECD11 and ECD12) provide, for example, the following effects.

An electric storage element SD11 is fabricated through the steps of: obtaining an electrode unit EU11 having a structure wherein one collector layer 15, two active material layers 13 and 16, and one ion permeable layer 12 are stacked together in a predetermined order, and the ambient regions of the active material layers 13 and 16 are filled with the first insulating layer 14 and the second insulating layer 17; and obtaining an electric storage element wherein a plurality of electrode units EU11 are stacked together and integrated. Therefore, a required number of electrode units EU11 prepared in advance can be stacked together and integrated to readily fabricate a desired electric storage element CD11. Additionally, a desired charge and discharge capacity can be readily attained by varying the number of electrode units EU11 stacked together.

The fabricated electric storage element SD11 has a laminated structure wherein the first active material layer 13 and the second active material layer 16 are tightly enclosed with the first insulating layer 14 and the second insulating layer 17 filling the ambient region between the active material layers and the ion permeable layer 12. This arrangement securely prevents a bit of the active material powder from falling off the outer edges of the first active material layers 13 and the second active material layers 16, due to an external force such as vibration or impact exerted when the electric storage element SD11, SD12, or SD13 or an electrochemical device ECD11 or ECD12 containing the electric storage element is transported, or due to an internal stress created during operation of the electrochemical device ECD11 or ECD12 (e.g., an internal stress created by a gas produced at charge or discharge). As a result, functional disorders caused by the fallen bit of the active material powder from the outer edges of the first active material layer 13 and the second active material layer 16 can be previously avoided.

The electrode unit EU11 of the electric storage element SD11 has a structure wherein part of the outer edge (the left edge in X direction) of the collector layers 15 is exposed from the side surface of the electrode unit EU11 through the first insulating layer 14 and the second insulating layer 17; and in the step of obtaining an electric storage element SD11, a plurality of electrode units EU11 are stacked together such that the direction orthogonal to laminating direction is alternated. Therefore, a plurality of collector layers 15 included in the electric storage element SD11 can be functionally divided into the first collector layers 15 used for one polarity and the second collector layers 15 used for the other polarity.

Through the step of providing the electric storage element SD11 with the first collective terminals TE11 and TE13 electrically connected to each of the first collector layers 15 at the exposed or internal part and used for one polarity, and the second collective terminals TE12 and TE14 electrically connected to each of the second collector layers 15 at the exposed or internal part and used for the other polarity, the electric storage element SD12, having the first collective terminal TE11 and the second collective terminal TE12, and the electric storage element SD13, having the first collective terminal TE13 and the second collective terminal TE14, can be fabricated precisely. Additionally, the electric storage elements SD12 and SD13 facilitate the connection to the portions of the packages PA11 and PA12 corresponding to outer terminals (i.e., the first outer terminal PA11c and the second outer terminal PA11d of the package PA11, and the first conductive case PA12a and the second conductive case PA12b of the package PA12), thus facilitating the fabrication of the electrochemical devices ECD11 and ECD12.

Each of the cut lines CLx and CLy on the laminated body MB11 may be set at positions distant from the outer edges of each of the active material layers 13 and 16; therefore, the laminated body MB11 can be cut without cutting the active material layers 13 and 16.

When the active material layers 13 and 16 are cut, the active material powder falls off the cut surfaces of each of the active material layers 13 and 16; therefore, the possibility of the functional disorders due to the fallen active material powder increases. The fabrication method according to one embodiment of the present invention securely prevents a bit of the active material powder from falling off in the cutting operation and previously avoids functional disorders caused by the fallen bit of the active material powder.

Subsequently, electric storage element for electrochemical devices according to another embodiment of the invention, and electrochemical device containing the electric storage element, and methods of fabricating the foregoings will be explained below.

Figure 15A:
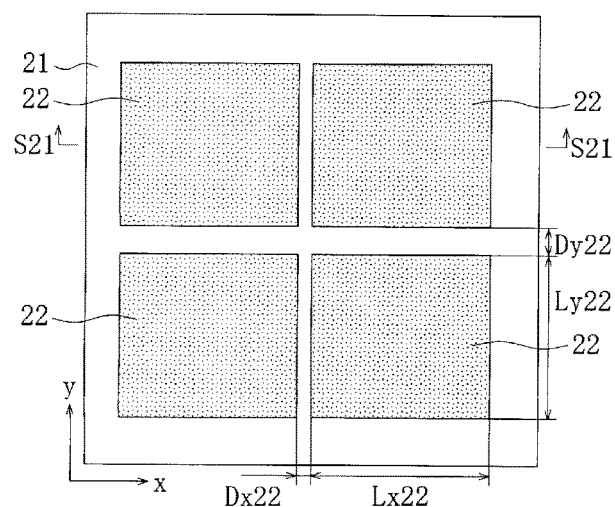
FIG. 15A is a diagram showing the first step of the method of fabricating an electric storage element as shown in FIG. 24.
Figure 15B:
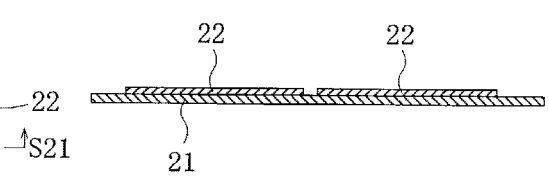
FIG. 15B is a sectional view taken along line S21-S21 of FIG. 15A.
Figure 24A:
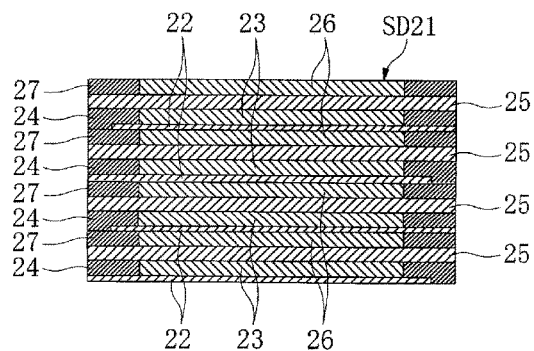
FIG. 24A is a sectional view of the electric storage element obtained through the eighth step.
Figure 24B:
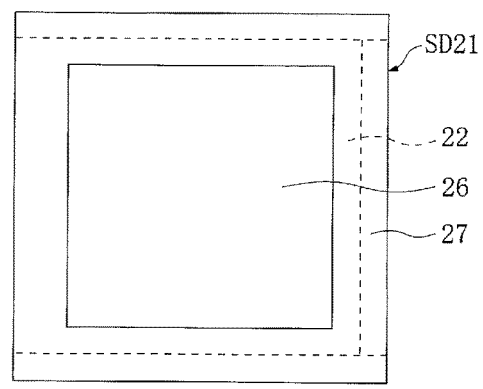
FIG. 24B is a top view of the same electric storage element.

As shown in FIGS. 15A and 15B, the first step of fabricating an electric storage element SD21 as shown in FIGS. 24A and 24B is to form four collector layers 22 having a rectangular top view outline in a predefined thickness on the top surface of a base film 11 having a rectangular top view outline.

In an embodiment, four second collector layers 22 are formed in a matrix form on a top surface of a base film 21 made of polyethylene-telephthalate (PET) having the thickness of 5 to 50 µm, by applying a paste prepared for forming an active material layer in a layer form by a known printing method such as screen printing or intaglio printing, and then drying the formed layer by a method such as hot air blowing or placing into a drying furnace. A thickness of each of the dried collector layers 22 is, for example, in a range of 1 to 30 µm.

The paste for forming the collector layer used herein may be the same as used to form the collector layer 15. Each of the collector layers 22 formed of the paste for forming the collector layer is electrically conductive.

As shown in FIGS. 15A and 15B, in an embodiment, each of the collector layers 22 has a length Lx22 in X direction and a length Ly22 in Y direction slightly smaller than Lx22. Also, the spacing Dx22 in X direction between the collector layers 22 formed in a matrix form is smaller than the spacing Dy22 in Y direction by an amount corresponding to Lx22−Ly22.

Figure 16A:
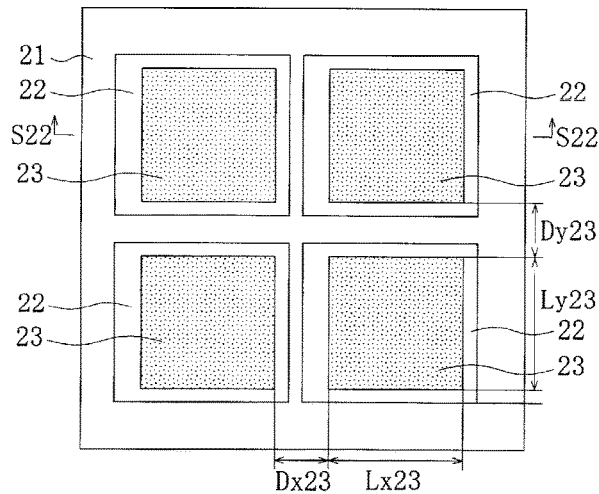
FIG. 16A is a diagram showing the second step of the method of fabricating the electric storage element as shown in FIG. 24.
Figure 16B:
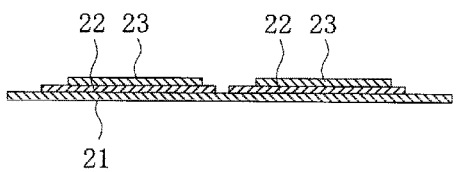
FIG. 16B is a sectional view taken along line S22-S22 of FIG. 16A.

Then, as shown in FIGS. 16A and 16B, four first active material layers 23 each having a rectangular top view outline are formed on the top surfaces of the corresponding collector layer 22 in a predefined thickness.

In an embodiment, four first active material layers 23 are formed in a matrix form on the top surfaces of the corresponding collector layers 22 by applying a paste prepared for forming the active material layers in a layer form by a known printing method such as screen printing or intaglio printing so as to substantially centrally cover the corresponding collector layers 22, and then drying the formed layers by a method such as hot air blowing or placing into a drying furnace. A thickness of each of the dried first active material layers 23 is, for example, in a range of 1 to 30 µm.

The paste for forming the active material layer used therein is the same as used to form the first active material layers 13. Each of the first active material layers 23 formed of the paste for forming the active material layer is electrically conductive.

As shown in FIGS. 16A and 16B, in an embodiment, each of the first active material layers 23 has a length Lx23 in X direction and a length Ly23 in Y direction equal to Lx23. The length Lx23 in X direction is slightly smaller than Lx22 in X direction of the collector layer 22, and the Ly23 in Y direction is slightly larger than the Ly22 in Y direction of the collector layer 22. Further, the spacing Dx23 in X direction and the spacing Dy23 in Y direction between the first active material layers 23 formed in a matrix form is equal. A center of each of the first active material layers 23 deviates to right in X direction by an amount corresponding to (Lx22−Ly22)/2 from a center of the corresponding collector layer 22.

In other words, in a top view of the first active material layers 23, each of the collector layers 22 covers an entire bottom surface of the corresponding first active material layer 23. Additionally, the upper edge and the lower edge in Y direction of each of the collector layers 22 extend beyond the upper edge and the lower edge in Y direction of the corresponding first active material layers 23, respectively, by an amount corresponding to (Ly22−Ly23)/2; and the right edge in X direction of each of the collector layers 33 extends beyond the right edge in X direction of the corresponding first active material layer 23 by the same amount. Also, the left edge in X direction of each of the collector layers 22 extends beyond the left edge in X direction of the corresponding first active material layer 23 by an amount corresponding to Lx22−[(Ly22+Ly23)/2] which is equal to one half the spacing Dx23 in X direction between the first active material layers 23.

Figure 17A:
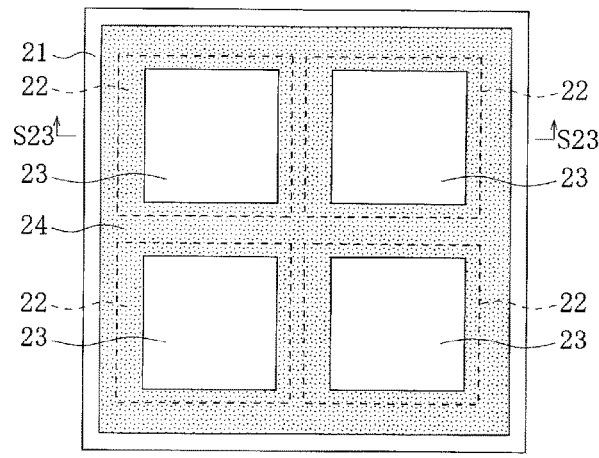
FIG. 17A is a diagram showing the third step of the method of fabricating the electric storage element as shown in FIG. 24.
Figure 17B:
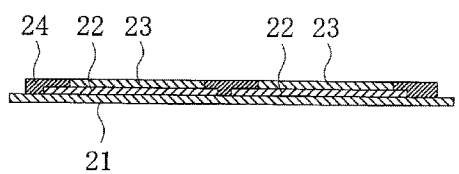
FIG. 17B is a sectional view taken along line S23-S23 of FIG. 17A.

Subsequently, as shown in FIGS. 17A and 17B, in an embodiment, a first insulating layer 24 is formed on the top surfaces of the base film 21 and the collector layers 22 to fill an ambient region of each of the first active material layers 23 and to make the top surface of the first insulating layer 24 even with the top surface of each of the first active material layers 23.

In an embodiment, the first insulating layer 24 is formed in the ambient region of the first active material layers 23 on the top surfaces of the base film 21 and the collector layers 22, by applying a paste prepared for forming the insulating layer in a layer form by a known printing method such as screen printing or intaglio printing, and then drying the formed layer by a method such as hot air blowing or placing into a drying furnace.

The paste for forming the insulating layer used herein may be the same as used to form the first insulating layer 14. The first insulating layer 24 formed of the paste for forming the insulating layer has a porosity that allows permeation of ions and impregnation and flow of an electrolyte.

As shown in FIGS. 17A and 17B, a top view outline of the first insulating layer 24 is slightly smaller than that of the base film 21.

Figure 18A:
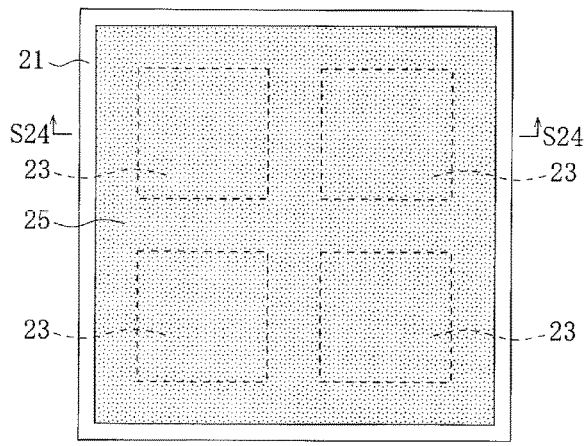
FIG. 18A is a diagram showing the fourth step of the method of fabricating the electric storage element as shown in FIG. 24.
Figure 18B:
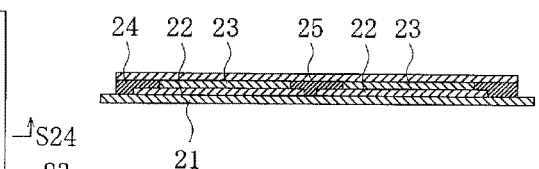
FIG. 18B is a sectional view taken along line S24-S24 of FIG. 18A.

Subsequently, as shown in FIGS. 18A and 18B, an ion permeable layer 25 having a rectangular top view outline is formed on the top surfaces of the first active material layers 23 and the first insulating layer 24 in a predefined thickness.

In an embodiment, the ion permeable layer 25 is formed on the top surfaces of first active material layers 23 and the first insulating layer 24 by applying a paste prepared for forming the ion permeable layer in a layer form by a known printing method such as screen printing or intaglio printing, and then drying the formed layer by a method such as hot air blowing or placing into a drying furnace. A thickness of thus dried ion permeable layer 25 is, for example, in a range of 3 to 30 µm.

The paste for forming the ion permeable layer used therein is the same as used to form the ion permeable layer 12. The ion permeable layer 25 formed of the paste for forming the ion permeable layer has a porosity that allows permeation of ions and impregnation and flow of an electrolyte.

As shown in FIGS. 18A and 18B, the top view outline of the ion permeable layer 25 is identical to that of the first insulating layer 24.

Figure 19A:
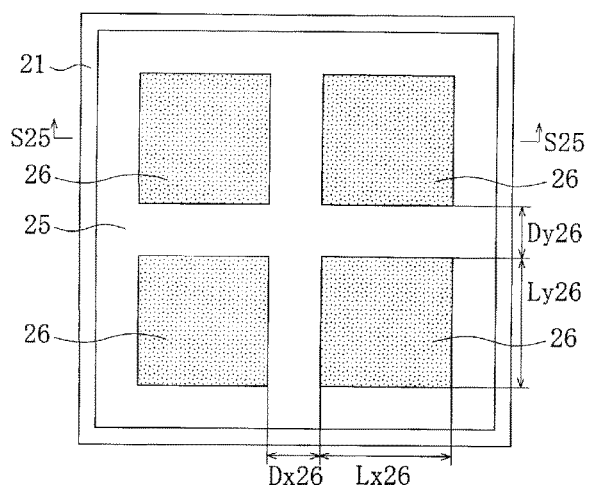
FIG. 19A is a diagram showing the fifth step of the method of fabricating the electric storage element as shown in FIG. 24.
Figure 19B:
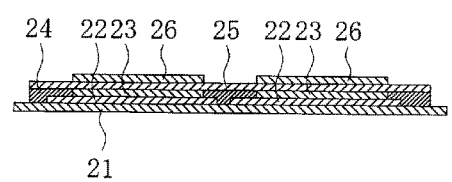
FIG. 19B is a sectional view taken along line S25-S25 of FIG. 19A.

Then, as shown in FIGS. 19A and 19B, four second active material layers 26 each having a rectangular top view outline are formed on the top surface of the ion permeable layer 25 in a predefined thickness.

In an embodiment, four second active material layers 26 are formed in a matrix form on the top surface of the ion permeable layer 25 by applying, in a layer form, a paste prepared for forming the active material layer by a known printing method such as screen printing or intaglio printing, and then drying the formed layer by a method such as hot air blowing or placing into a drying furnace. A thickness of each of the dried first active material layers 26 is, for example, in a range of 2 to 30 µm.

The paste for forming the active material layer used therein may be the same as used to form the first active material layers 13. Each of the second active material layers 26 formed of the paste for forming the active material layer is electrically conductive.

As shown in FIGS. 19A and 19B, in an embodiment, each of the second active material layers 26 has a length Lx26 in X direction and a length Ly26 in Y direction equal to Lx26. Lx26 in X direction may be equal to Lx23 in X direction of the first active material layer 23, and Ly26 in Y direction may be equal to Ly23 in Y direction of the first active material layer 23. Further, the second active material layers 26 may be disposed such that the center of each of the second active material layers 26 corresponds to the center of the corresponding first active material layers 23.

In an embodiment, in a top view of the second active material layers 26, the upper edge in Y direction, the lower edge in Y direction, the left edge in X direction, and the right edge in X direction of each of the second active material layers 26 corresponds to the upper edge in Y direction, the lower edge in Y direction, the left edge in X direction, and the right edge in X direction of the corresponding first active material layer 23, respectively.

Subsequently, as shown in FIGS. 20A and 20B, in an embodiment, a second insulating layer 27 is formed on the top surface of the ion permeable layer 25 to fill the ambient region of each of the second active material layers 26 and to make the top surface of the second insulating layer 27 even with the top surfaces of each of the second active material layers 26.

In an embodiment, the second insulating layer 27 is formed in the ambient region of the second active material layer 26 on the top surface of the ion permeable layer 25 by applying, in a layer form, a paste prepared for forming the insulating layer by a known printing method such as screen printing or intaglio printing, and then drying the formed layer by a method such as hot air blowing or placing into a drying furnace.

The paste for forming the insulating layer used herein may be the same as used to form the first insulating layer 14. The second insulating layer 27 formed of the paste for forming the insulating layer has a porosity that allows permeation of ions and impregnation and flow of an electrolyte.

As shown in FIGS. 20A and 20B, the top view outline of the second insulating layer 27 is identical to that of the ion permeable layer 25.

Subsequently, the base film 21 is removed from the structure as shown in FIGS. 20A and 20B, thereby obtaining an electrode unit EU21 having a laminated structure as shown in FIG. 21. The electrode unit EU21 has a structure wherein the collector layer 22, the first active material layer 23, the ion permeable layer 25, and the second active material layer 26 are stacked together and wherein the ambient regions of the first active material layer 23 and the second active material layer 26 are filled with the first insulating layer 24 and the second insulating layer 27, respectively.

Figure 22:
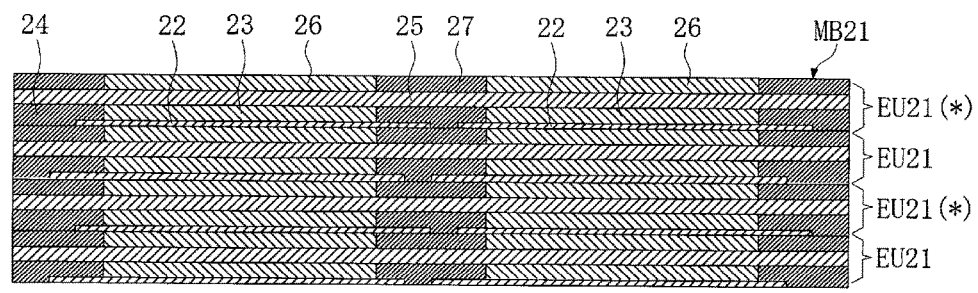
FIG. 22 is a sectional view of a laminated body showing the seventh step of the method of fabricating the electric storage element as shown in FIG. 24.

Subsequently, as shown in FIG. 22, a plurality (four in the figure) of the electrode units EU21 are stacked together such that the X direction (orthogonal to the laminating direction) of the electrode units is alternated by 180°, and are heated and pressurized to produce a laminated body MB21 comprising the integrated electrode units EU21.

Of the four electrode units EU21 shown in FIG. 22, the second and fourth electrode units EU21 from the bottom accompanied by an asterisk beside the reference sign have the X direction of the electrode unit shown in FIG. 21 altered by 180°.

When the stacked electrode units are being heated and pressurized, the layers constituting each electrode unit EU21 are urged slightly in the lamination direction; therefore, the layers constituting each electrode unit EU21 are adhered tightly to each other at the interfaces, and neighboring electrode units EU21 are also adhered tightly to each other at the interfaces.

Also, the left edge in X direction of each of the collector layers 22 extends beyond the left edge in X direction of the corresponding first active material layer 23 by an amount equal to one half the spacing Dx23 in X direction between the first active material layers 23; therefore, as viewed from above, the left edges in X direction of the first and third collector layers 22 from the bottom disposed in the right part in X direction of the laminated body MB21 correspond to the right edges in X direction of the second and fourth collector layers 22 from the bottom disposed in the left part in X direction of the laminated body MB21.

Figure 23:
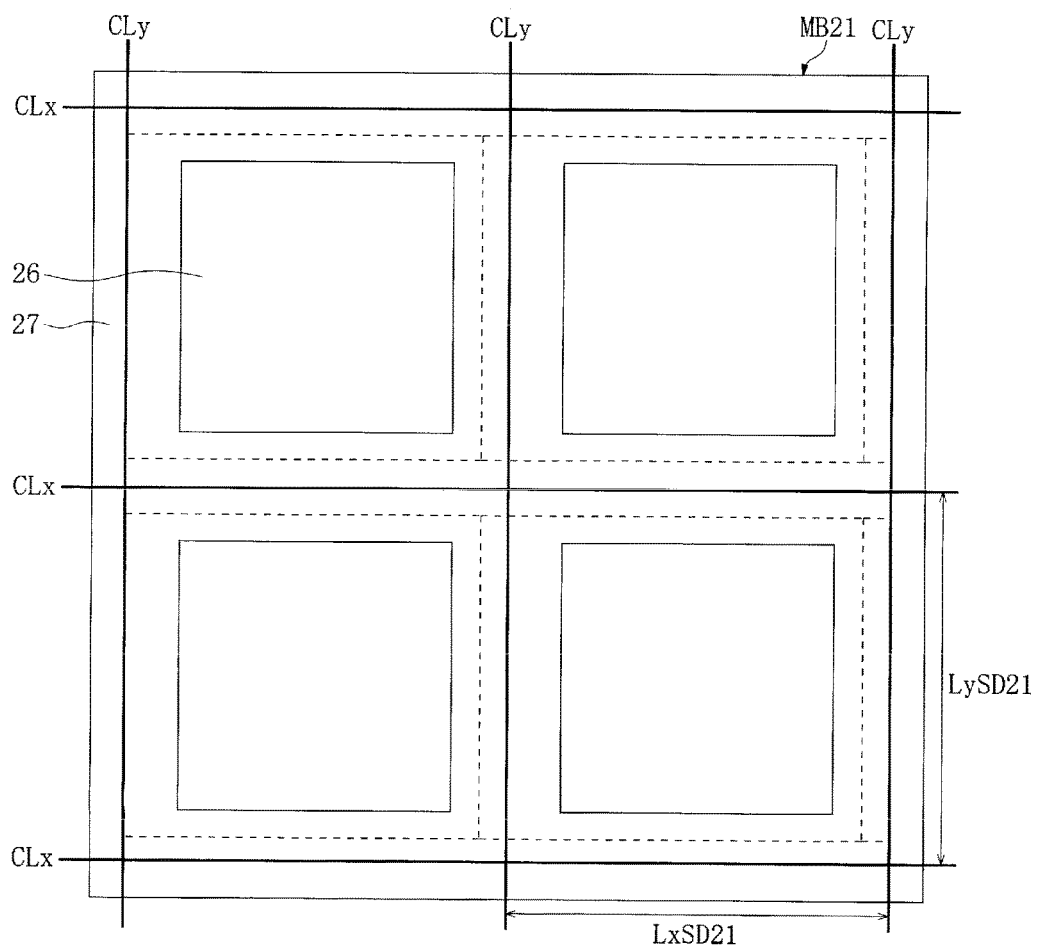
FIG. 23 is a sectional view of a laminated body showing the eighth step of the method of fabricating the electric storage element as shown in FIG. 24.

Subsequently, as shown in FIG. 23, cut line CLx in X direction and cut line CLy in Y direction are set on the top surface of the laminated body MB21.

In an embodiment, each of the cut lines CLy in Y direction are set to align with left edges in X direction of the first and third collector layers 22 from the bottom and the right edges in X direction of the second and fourth collector layers 22 from the bottom of the laminated body MB21 shown in FIG. 22. Also, a center cut line CLx in X direction is set to align with a center of the spacing Dy23 in Y direction between the first active material layers 23 (i.e., the spacing Dy26 in Y direction between the second active material layers 26). Further, the other two cut lines CLx in X direction are set such that each of the first active material layers 23 has a spacing corresponding to one half the spacing Dy23 in Y direction on both the upper edge in Y direction and the lower edge in Y direction.

Subsequently, the laminated body MB21 is cut with a cutting device such as a dicing device having a rotating blade along the cut lines CLx in X direction and the cut lines CLy in Y direction as shown in FIG. 23, thereby obtaining four electric storage elements SD21 having a laminated structure as shown in FIGS. 24A and 24B.

The cutting is performed with a width corresponding to a thickness of the blade; therefore, the left edges in X direction of the first and third collector layers 22 from the bottom of the electric storage element SD21 are exposed from the left side surface in X direction of the electric storage element SD21 through the first insulating layer 24 and the second insulating layer 27. Also, the right edges in X direction of the second and fourth collector layers 22 from the bottom of the electric storage element SD21 are exposed from the right side surface in X direction of the electric storage element SD11 through the first insulating layer 24 and the second insulating layer 27.

For convenience of illustration, FIGS. 15 to 24 show a method for simultaneously fabricating four electric storage elements SD21 by using a plurality of four-piece electrode units EU21. The same fabricating method can be applied to a plurality of five-or-more-piece electric storage elements stacked together to simultaneously fabricate five or more electric storage elements. Also, the same fabricating method can be applied to a plurality of one-piece electric storage elements stacked together to fabricate one electric storage element.

Additionally, for a convenience of illustration, FIGS. 15 to 24 show a method of fabricating an electric storage element SD21 with four electrode units EU21 stacked together. The charge and discharge capacity can be changed in accordance with the number of stacked electrode units EU21.

In an electric storage element SD21 as shown in FIGS. 24A and 24B, the two collector layers 22 with the left edges in X direction exposed from the left side surface in X direction of the electric storage element SD21 tare available as collector layers for one polarity (hereinafter referred to as "first collector layers 22"); on the other hand, the two collector layers 22 with the right edges in X direction exposed from the right side surface in X direction of the electric storage element SD21 are available as collector layers for the other polarity (hereinafter referred to as "second collector layers 22").

Also, the top surface and the bottom surface of the active material layers (the first active material layer 23 and the second active material layer 26) are covered with the ion permeable layer 25 or the first collector layer 22. The ambient region corresponding to the difference between the outlines of the active material layers and the ion permeable layer 25 are filled with insulating layers (the first insulating layer 24 and the second insulating layer 27) tightly adhered to the active material layers. Therefore, the active material layers (the first active material layer 23 and the second active material layer 26) are entirely enclosed in other materials constituting the electric storage element SD11 and are not exposed outside the electric storage element SD11.

Figure 25A:
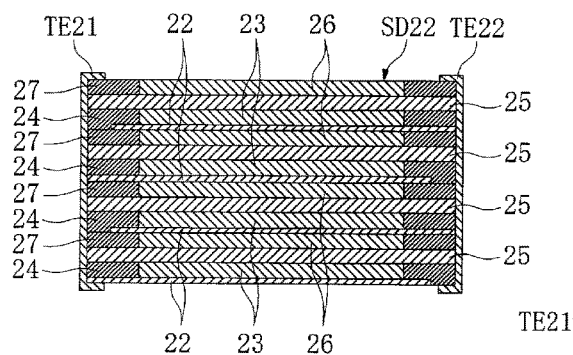
FIG. 25A is a sectional view of an example of the electric storage element shown in FIG. 24 provided with terminals.
Figure 26A:
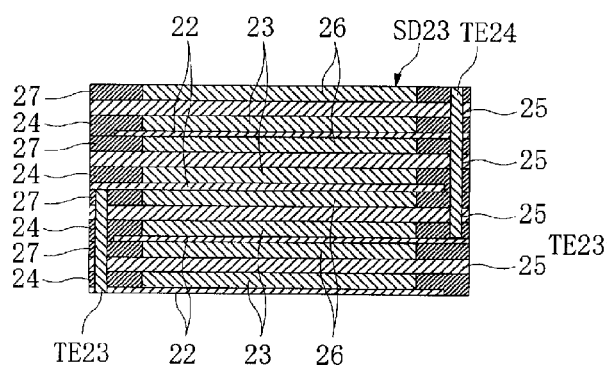
FIG. 26A is a sectional view of another example of the electric storage element shown in FIG. 24 provided with terminals.
Figure 26B:
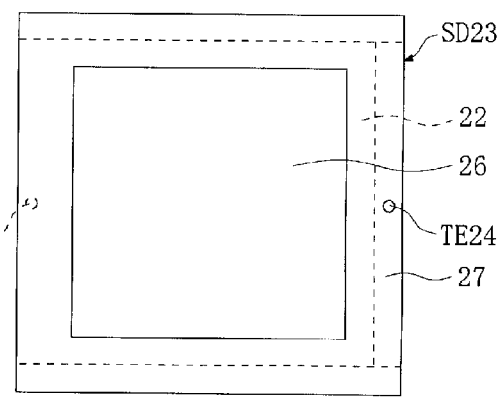
FIG. 26B is a top view of the same electric storage element.

FIGS. 25A and 26B show an electric storage element SD22 fabricated by providing the electric storage element SD21 with terminals TE21 and TE22. The electric storage element SD22 is provided, on the left side surface in X direction, with the first collective terminal TE21 covering the left side surface in X direction; and the first collective terminal TE21 is electrically connected to the exposed part of each of the first collector layers 22. The electric storage element SD22 is provided, on the right side surface in X direction, with the second collective terminal TE22 covering the right side surface in X direction; and the second collective terminal TE22 is electrically connected to the exposed part of each of the second collector layers 22.

The first collective terminal TE21 and the second collective terminal TE22 are formed by, for example, applying a paste prepared for forming the terminals in a layer form to the left and right side surfaces in X direction of the electric storage element SD22 by a known printing method such as dip method, and then drying the formed layer by a method such as hot air blowing or placing into a drying furnace.

The paste for forming the terminals used herein may be the same as used to form the first collective terminal TE11 and the second collective terminal TE12. Each of the terminals TE21 and TE22 formed of the paste for forming the terminals is electrically conductive.

FIGS. 26A and 26B show an electric storage element SD23 fabricated by providing the electric storage element SD21 according to an embodiment with terminals TE23 and TE24. The electric storage element SD23 is provided, in the left part in X direction, with a columnar hole extending upwardly from the bottom surface. The columnar hole contains a first collective terminal TE23 having a columnar shape and electrically connected to an internal part of the exposed portions of each of first collector layers 22. Also, the electric storage element SD23 is provided, in the right part in X direction, with a columnar hole extending downwardly from the top surface. The columnar hole contains a second collective terminal TE24 having a columnar shape and electrically connected to an internal part of the exposed portions of each of second collector layers 22. Further, the bottom surface of the first collective terminal TE23 is exposed at the bottom surface of the electric storage element SD23, and the top surface of the second collective terminal TE24 is exposed at the top surface of the electric storage element SD23.

The first collective terminal TE23 and the second collective terminal TE24 are formed by, for example, forming a column shaped hole upwardly from the bottom surface in laminating direction, in the left part in X direction of electric storage element SD23 by a known method such as drilling or laser machining, filling a paste prepared for forming the terminals into the columnar holes, and then drying the filled paste by a method such as hot air blowing or placing into a drying furnace.

The paste for forming the terminals used herein may be the same as used to form the first collective terminal TE11 and the second collective terminal TE12. Each of the terminals TE23 and TE24 formed of the paste for forming the terminals is electrically conductive.

Figure 25B:
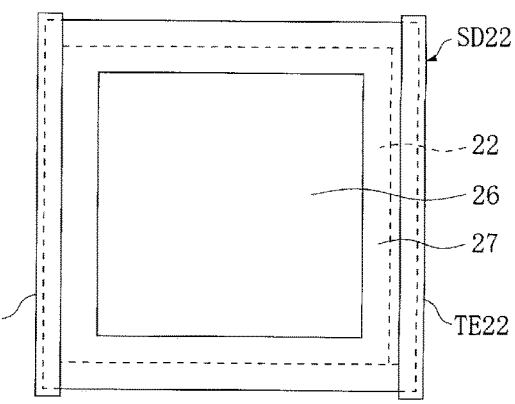
FIG. 25B is a top view of the same electric storage element.

With the electric storage element SD22 as shown in FIGS. 25A and 25B, an electric device similar to the electrochemical device ECD11 as shown in FIG. 13 can be fabricated. With the electric storage element SD23 as shown in FIGS. 26A and 26B, an electric device similar to the electrochemical device ECD12 as shown in FIG. 14 can be fabricated.

The electric storage elements (SD21, SD22, and SD23) and electrochemical devices containing the electric storage elements provide the same effects as described for the electric storage elements (SD21, SD22, and SD23). The method for fabricating the electric storage elements (SD21, SD22, and SD23) and the method for fabricating the electrochemical devices provide the same effects as described for the method for fabricating the electric storage elements (SD21, SD22, and SD23).

In the above-mentioned embodiments, the electric storage elements SD11 are fabricated by stacking and integrating a plurality (four in the figure) of electrode units EU11 and EU21 to obtain a laminated body MB11 and then cutting the laminated body MB11 along the cut lines CLx and CLy. Alternatively, the electric storage elements SD11 and SD21 may be fabricated by cutting the electrode units EU11 and EU21 along the same cut lines CLx and CLy set on the electrode units EU11 and EU21 to obtain electrode units for the electric storage elements SD11 and SD21, and then stacking and integrating a plurality of the electrode units. This process also enables fabrication of the electric storage elements SD11 and SD21 and the electrochemical devices ECD11 and ECD12 as described above, and provides the same effects as described for the electric storage elements (SD21, SD22, and SD23). The dimensions, materials, and the fabrication methods of the components (base film 11, ion permeation layer, collector layer, active material layer, insulating layer, and collective terminal) as explained herein are mere examples. The embodiments described are susceptible of various modifications.

INDUSTRIAL APPLICABILITY

Various embodiments of the present invention may be applied to various kinds of electrochemical devices such as electric double layer capacitors, lithium ion capacitors, redox capacitors, and lithium ion batteries. Those electrochemical devices may achieve the above-mentioned advantageous effects.

LIST OF REFERENCE NUMBERS 11 base film
12 ion permeable layer 13 first active material layer
14 first insulating layer
15 collector layer (first collector layer, second collector layer)
16 second active material layer
17 second insulating layer
EU11 electrode unit
MB11 laminated body
SD11, SD12, SD13 electric storage element
TE11, TE13 first collective terminal
TE12, TE14 second collective terminal
ECD11, ECD12 electrochemical device
PA11, PA12 package
21 base film
22 collector layer (first collector layer, second collector layer)
23 first active material layer
24 first insulating layer
25 ion permeable layer
26 second active material layer
27 second insulating layer
EU21 electrode unit
MB21 laminated body
SD21, SD22, SD23 electric storage element
TE21, TE23 first collective terminal
TE22, TE24 second collective terminal

What is claimed is:

1. An electrochemical device comprising an electric storage element encapsulated in a package together with an electrolyte, the electric storage element having a laminated structure wherein a first active material layer is placed between a first ion permeable layer and a first collector layer, the first collector layer having a second active material layer on its opposite side, a third active material layer between the first ion permeable layer and a second collector layer, the second collector layer having a fourth active material layer on its opposite side, and a second ion permeable layer provided adjacent to the fourth active material layer,
wherein each of the active material layers have a smaller outline than the ion permeable layers,
wherein the laminated structure further comprises insulating layers, wherein the insulating layers entirely cover and enclose peripheral outer edges of each of the active material layers along their outlines and fill respective ambient regions corresponding to a difference in outlines from the ion permeable layers such that the peripheral outer edges of each of the active material layers is not exposed, and wherein one or more of the insulating layers have a porosity that allows permeation of ions and impregnation and flow of the electrolyte;
wherein a top surface and bottom surface of each of the first and second collector layers are covered by the active material layers and the insulating layers;
wherein a part of an outer edge of the first collector layer is exposed at a first side surface of the electric storage element through the insulating layers and the opposite outer edge of the first collector layer is covered by the insulating layers at a second side surface;
wherein a part of an outer edge of the second collector layer is exposed at the second side surface of the electric storage element through the insulating layers at a position different from that of the exposed part of the first collector layer and the opposite outer edge of the second collector layer is covered by the insulating layers at the first side surface; and
wherein a top view outline of each of the insulating layers is identical to outlines of both the first ion permeable layer and the second ion permeable layer.

2. The electrochemical device according to claim 1, further comprising:
a first collective terminal electrically connected to the first collector layer at its exposed or internal part; and
a second collective terminal electrically connected to the second collector layer at its exposed or internal part,
wherein both the first collective terminal and the second collective terminal are contained in the package.

3. The electrochemical device according to claim 2, wherein the first collective terminal covers the first side surface of the electric storage element, and wherein the second collective terminal covers the second side surface of the electric storage element.

4. The electrochemical device according to claim 1, the laminated structure further comprising a fifth active material layer placed between a third ion permeable layer and a third collector layer, the third collector layer having a sixth active material layer adjacent its opposite side, wherein the sixth active material layer is provided adjacent to the second ion permeable layer, wherein a part of an outer edge of the third collector layer is exposed at the first side surface of the electric storage element through the insulating layers and the opposite outer edge of the third collector layer is covered by the insulating layers, wherein the fifth and sixth active material layers are enclosed entirely along their peripheral outer edges and covered by insulating layers filling respective ambient regions corresponding to a difference in outlines from the ion permeable layers such that the peripheral outer edges of the fifth and sixth active material layers are not exposed, and wherein the insulating layers covering the fifth and sixth active material layers have a porosity that allows permeation of ions and impregnation and flow of the electrolyte.

* * * * *